United States Patent
Nakanishi et al.

(10) Patent No.: US 12,269,459 B2
(45) Date of Patent: Apr. 8, 2025

(54) HYBRID ELECTRIC VEHICLE

(71) Applicant: TOYOTA JIDOSHA KABUSHIKI KAISHA, Toyota (JP)

(72) Inventors: Naoki Nakanishi, Nagoya (JP); Masato Yoshikawa, Toyota (JP); Hironobu Aratake, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 296 days.

(21) Appl. No.: 17/948,565

(22) Filed: Sep. 20, 2022

(65) Prior Publication Data

US 2023/0104075 A1  Apr. 6, 2023

(30) Foreign Application Priority Data

Sep. 24, 2021  (JP) .................. 2021-155966

(51) Int. Cl.
*B60W 20/00* (2016.01)
*B60K 6/26* (2007.10)
(Continued)

(52) U.S. Cl.
CPC ............... *B60W 20/40* (2013.01); *B60K 6/26* (2013.01); *B60K 6/387* (2013.01); *B60K 6/40* (2013.01);
(Continued)

(58) Field of Classification Search
CPC ......... B60W 20/40; B60W 2510/1005; B60W 2520/10; B60W 2540/12; B60W 50/06;
(Continued)

(56) References Cited

U.S. PATENT DOCUMENTS

| | | | |
|---|---|---|---|
| 6,371,889 B1 * | 4/2002 | Kuroda | B60K 6/485 903/917 |
| 2013/0073133 A1 * | 3/2013 | Muta | F02D 29/02 903/930 |

(Continued)

FOREIGN PATENT DOCUMENTS

| | | |
|---|---|---|
| JP | 2005-045858 A | 2/2005 |
| JP | 2011-073564 A | 4/2011 |
| JP | 2015051707 A * | 3/2015 |

OTHER PUBLICATIONS

Translation of JP-2015051707-A. Kuwabara et al. Hybrid-Vehicular Control Apparatus. Mar. 19, 2015 (Year: 2015).*

*Primary Examiner* — Bao Long T Nguyen
*Assistant Examiner* — Tien Minh Le
(74) *Attorney, Agent, or Firm* — Oliff PLC

(57) ABSTRACT

A hybrid electric vehicle including: (a) an engagement device disposed between an engine and an electric motor; (b) a transmission disposed between the electric motor and drive wheels; (c) an electric storage device configured to supply an electric power to the electric motor; and (d) a control apparatus. When the engine is to be started, the engagement device is engaged to transmit a torque from the electric motor to the engine, for thereby starting the engine. The control apparatus is configured to inhibit stop of the engine, when an outputtable electric power outputtable from the electric storage device is not larger than a threshold value. The threshold value is not smaller than a start-case-required electric power that is required to start the engine, such that a difference value between the threshold value and the start-case-required electric power is not larger than a predetermined value.

5 Claims, 5 Drawing Sheets

(51) Int. Cl.
  *B60K 6/387*   (2007.10)
  *B60K 6/40*   (2007.10)
  *B60W 20/40*   (2016.01)

(52) U.S. Cl.
  CPC .................. *B60K 2006/268* (2013.01); *B60W 2510/1005* (2013.01); *B60W 2520/10* (2013.01); *B60W 2540/12* (2013.01)

(58) Field of Classification Search
  CPC ............... B60W 2050/0026; B60W 2510/182; B60W 2510/244; B60W 2510/246; B60W 2510/305; B60W 2520/04; B60W 2540/10; B60W 2540/16; B60W 10/02; B60W 10/06; B60W 10/08; B60W 20/11; B60W 20/13; B60K 6/26; B60K 6/387; B60K 6/40; B60K 2006/268; B60K 6/547; B60K 2006/4825; B60K 6/48; Y02T 10/62
  See application file for complete search history.

(56) References Cited

U.S. PATENT DOCUMENTS

2013/0090797 A1\* 4/2013 Izumi ........................ H02J 7/04
  701/22
2019/0367010 A1\* 12/2019 Kitahata ................ B60K 6/547
2022/0056876 A1\* 2/2022 Takeuchi ............... B60K 6/442

\* cited by examiner

HYBRID ELECTRIC VEHICLE

This application claims priority from Japanese Patent Application No. 2021-155966 filed on Sep. 24, 2021, the disclosure of which is herein incorporated by reference in its entirety.

FIELD OF THE INVENTION

The present invention relates to a hybrid electric vehicle including an internal combustion engine, an electric motor and a frictional engagement device disposed between the internal combustion engine and the electric motor.

BACKGROUND OF THE INVENTION

There is well-known a hybrid electric vehicle including an internal combustion engine and an electric motor that serve as drive power sources for driving the vehicle. A hybrid electric vehicle disclosed in JP2005-45858A is an example of such a hybrid electric vehicle. This Japanese Patent Application Publication discloses that a maximum output outputtable by a battery is limited as a temperature of the battery is reduced.

SUMMARY OF THE INVENTION

By the way, there is proposed a hybrid electric vehicle including an internal combustion engine, an electric motor and a frictional engagement device disposed between the internal combustion engine and the electric motor. In such a hybrid electric vehicle, when the internal combustion engine is to be started, the electric motor is driven with use of an electric power supplied from a battery, whereby the internal combustion engine is cranked with a cranking torque transmitted from the electric motor through the frictional engagement device. In the hybrid electric vehicle, it becomes more difficult to enable an output required to start the internal combustion engine, to be covered by the electric motor, as a maximum output outputtable by the battery is reduced. Therefore, upon switching from a state in which the vehicle is driven by only the electric motor to another state in which the vehicle is driven by also the internal combustion engine, the output of the electric motor could be insufficient, thereby resulting in a risk of shock caused by the insufficiency of the output of the electric motor. It might be possible to employ an arrangement in which stop of the internal combustion engine is inhibited immediately if the maximum output of the battery is reduced. In this arrangement, although the shock is unlikely to be caused upon start of the internal combustion engine, a time of driving of the internal combustion engine is likely to be increased, thereby resulting in a risk of reduction of fuel economy.

The present invention was made in view of the background art described above. It is therefore an object of the present invention to provide a hybrid electric vehicle including an internal combustion engine, an electric motor and a frictional engagement device disposed between the internal combustion engine and the electric motor, wherein the hybrid electric vehicle is capable of suppressing a shock caused upon start of the internal combustion engine while suppressing reduction of fuel economy.

The object indicated above is achieved according to the following aspects of the present invention.

According to a first aspect of the invention, there is provided a hybrid electric vehicle comprising: (a) an internal combustion engine; (b) an electric motor; (c) drive wheels; (d) a frictional engagement device disposed between the internal combustion engine and the electric motor in a power transmission path through which a power is to be transmitted from the internal combustion engine to the drive wheels; (e) a transmission disposed between the electric motor and the drive wheels in the power transmission path; (f) an electric storage device configured to supply an electric power to the electric motor; and (g) a control apparatus, wherein, when the internal combustion engine is to be started, the frictional engagement device is engaged to transmit a torque from the electric motor to the internal combustion engine, for thereby starting the internal combustion engine, and wherein the control apparatus is configured to inhibit stop of the internal combustion engine, when an outputtable electric power outputtable from the electric storage device is not larger than a threshold value, the threshold value being not smaller than a start-case-required electric power that is required to start the internal combustion engine, such that a difference value between the threshold value and the start-case-required electric power is not larger than a predetermined value.

According to a second aspect of the invention, in the hybrid electric vehicle according to the first aspect of the invention, the threshold value includes an acceleration-case-required electric power required to accelerate the vehicle, when a running speed of the vehicle is in a range not higher than a predetermined speed value.

According to a third aspect of the invention, in the hybrid electric vehicle according to the first or second aspect of the invention, the threshold value is set to a value that is constant or increased as a running speed of the vehicle is increased.

According to a fourth aspect of the invention, in the hybrid electric vehicle according to any one of the first through third aspects of the invention, when the vehicle is being stopped, the threshold value is set to a value that is changed depending on a brake depressing force applied to a brake operating member of the vehicle, such that the threshold value is reduced as the brake depressing force is increased.

According to a fifth aspect of the invention, in the hybrid electric vehicle according to the fourth aspect of the invention, when a shift operation position, which is to be changed by a shift operation device of the vehicle, is a vehicle stop position, the threshold value is set to a minimum value that is irrespective of the brake depressing force.

According to a sixth aspect of the invention, in the hybrid electric vehicle according to any one of the first through fifth aspects of the invention, the start-case-required electric power, which is required to start the internal combustion engine, includes a first required electric power required to increase a rotational speed of the internal combustion engine by the electric motor, a second required electric power required to eliminate backlash present in the power transmission path, and a third required electric power that is to be consumed by auxiliary devices provided in the vehicle.

In the hybrid electric vehicle according to the first aspect of the invention, the stop of the internal combustion engine is inhibited when the outputtable electric power outputtable from the electric storage device is not larger than the threshold value that is not smaller than the start-case-required electric power required to start the internal combustion engine, so that it is possible to suppress the shock caused due to insufficiency of the electric power upon start of the internal combustion engine. Further, since the difference value between the threshold value and the start-case-required electric power is not larger than the predetermined value, it is possible to minimize a length of time for which the internal combustion engine is driven, and accordingly to suppress reduction of the fuel economy.

In the hybrid electric vehicle according to the second aspect of the invention, when the running speed of the vehicle is in the range not higher the predetermined speed value, the threshold value includes the acceleration-case-required electric power required to accelerate the vehicle, so that it is possible to ensure an acceleration performance in a low range of the running speed in which the acceleration performance is required.

In the hybrid electric vehicle according to the third aspect of the invention, the threshold value is set to the value that is constant or increased as the running speed of the vehicle is increased, so that it is possible to suppress frequent switch between start and stop of the internal combustion engine, even in a case in which the start-case-required electric power is fluctuated due to shift-down actions executed in the transmission.

In the hybrid electric vehicle according to the fourth aspect of the invention, when the vehicle is being stopped, the threshold value is changed depending on the brake depressing force, such that the threshold value is reduced as the brake depressing force is increased. Thus, the threshold value is set to a value appropriately dependent on the brake depressing force, so that the reduction of the fuel economy can be further suppressed.

In the hybrid electric vehicle according to the fifth aspect of the invention, when the shift operation position is the vehicle stop position, the threshold value is set to the minimum value that is irrespective of the brake depressing force, so that the internal combustion engine in unlikely to be driven whereby the reduction of the fuel economy can be further suppressed.

In the hybrid electric vehicle according to the sixth aspect of the invention, the start-case-required electric power, which is required to start the internal combustion engine, includes the first required electric power required to increase the rotational speed of the internal combustion engine by the electric motor, the second required electric power required to eliminate the backlash present in the power transmission path, and the third required electric power that is to be consumed by the auxiliary devices provided in the vehicle. Therefore, with the start-case-required electric power being calculated with the first, second and third required electric power being added to one another, it is possible to suppress the shock due to insufficiency of the electric power supplied to the electric power, the shock generated upon elimination of the backlash present in the power transmission path, and influence due to insufficiency of the electric power supplied to the auxiliary devices.

DETAILED DESCRIPTION OF PREFERRED EMBODIMENT

Hereinafter, there will be described preferred embodiment in detail with reference to the accompanying drawings. It is noted that figures of the drawings are simplified or deformed as needed, and each portion is not necessarily precisely depicted in terms of dimension ratio, shape, etc.

Embodiment

Figure 1:
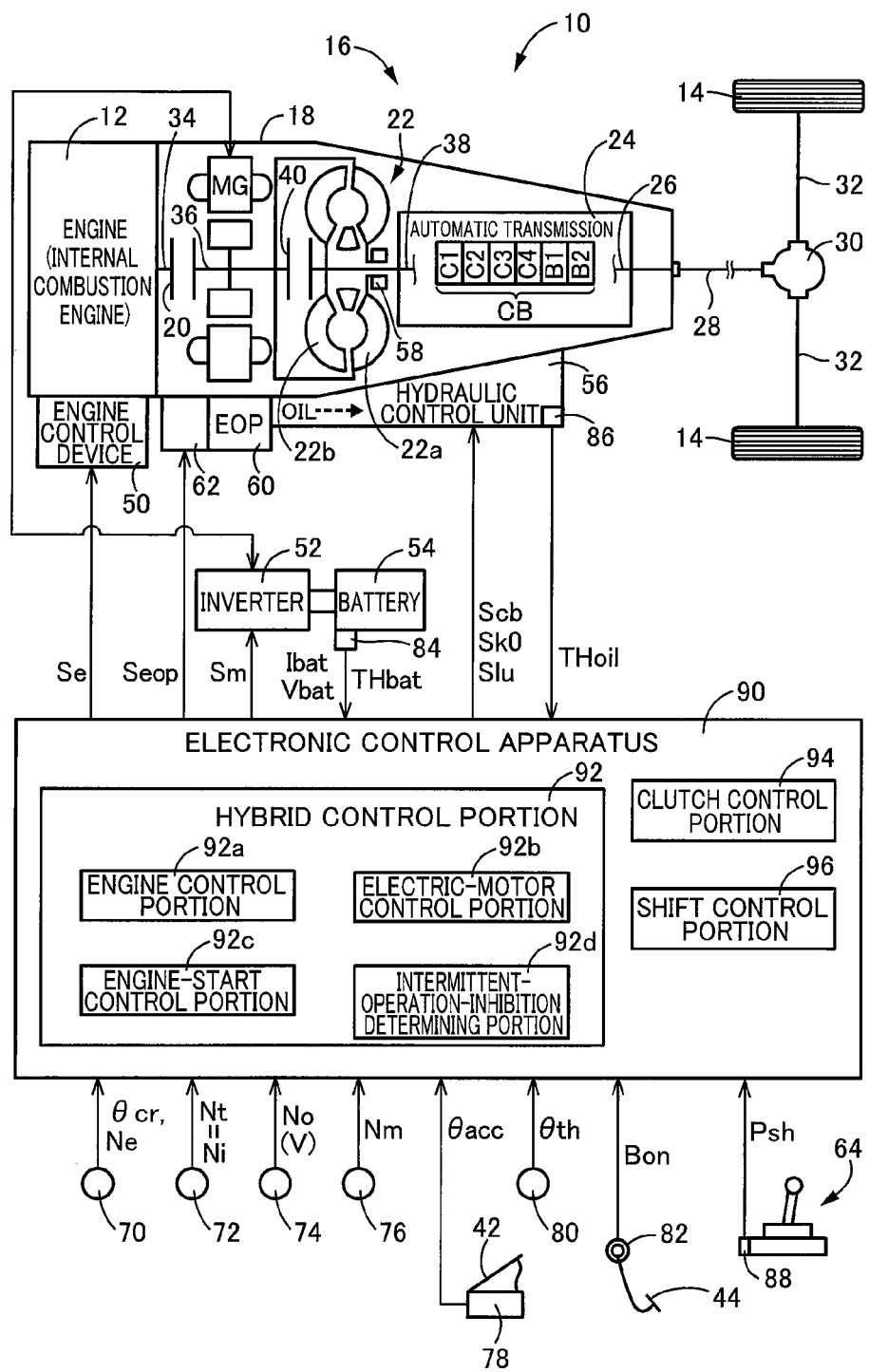
FIG. 1 is a view schematically showing a construction of a vehicle to which the present invention is applied, for explaining major portions of control functions and control systems that are provided to perform various control operations in the vehicle.

FIG. 1 is a view schematically showing a construction of a vehicle 10 to which the present invention is applied, for explaining major portions of control functions and control systems that are provided to perform various control operations in the vehicle 10. As shown in FIG. 1, the vehicle 10 is a hybrid electric vehicle including an engine 12 and an electric MG that serve as drive power source for driving the vehicle 10. The vehicle 10 further includes drive wheels 14 and a power transmission apparatus 16 that is provided in a power transmission path between the engine 12 and the drive wheels 14.

The engine 12 is a known internal combustion engine such as gasoline engine and diesel engine. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 12, is controlled.

The electric motor MG is a rotating electric machine having a function serving as a motor configured to generate a mechanical power from an electric power and a function serving as a generator configured to generate an electric power from a mechanical power. That is, the electric motor MG is a so-called "motor generator". The electric motor MG is connected to a battery 54 provided in the vehicle 10, through an inverter 52 provided in the vehicle 10. The inverter 52 is controlled by the electronic control apparatus 90 whereby an MG torque Tm as an output torque of the electric motor MG is controlled. The MG torque Tm serves as a power driving torque when acting as a positive torque for acceleration, with the electric motor MG being rotated in a forward direction that is the same as a direction of rotation of the engine 12 during operation of the engine 12. The MG torque Tm serves as a regenerative torque when acting as a negative torque for deceleration, with the electric motor MG being rotated in the forward direction. Specifically, the electric motor MG receives the electric power from the battery 54 through the inverter 52, and generates the power for driving the vehicle 10, in place of or in addition to the engine 12. Further, the electric motor MG generates the electric power based on the power of the engine 12 or a driven power transmitted from the drive wheels 14. The electric power generated by the electric motor MG is supplied to the battery 54 through the inverter 52 so as to be stored in the battery 54. The battery 54 is an electric storage device to and from which the electric power is supplied from and to the electric motor MG. The electric power corresponds to an electric energy unless they are to be distinguished from each other. The power corresponds to a force or a torque unless they are to be distinguished from each other. It is noted that the battery 54 corresponds to "electric storage device" recited in the appended claims.

The power transmission apparatus 16 includes a casing 18, a K0 clutch 20, a torque converter 22 and an automatic transmission 24. The K0 clutch 20, torque converter 22 and automatic transmission 24 are disposed inside the casing 18 as a non-rotary member that is attached to a body of the vehicle 10. The K0 clutch 20 is a hydraulically-operated frictional engagement device that is disposed between the engine 12 and the electric motor MG in the power transmission path between the engine 12 and the drive wheels 14. The torque converter 22 is connected to the engine 12 through the K0 clutch 20.

The automatic transmission 24 is connected to the torque converter 22, and is disposed between the torque converter 22 and the drive wheels 14 in the power transmission path. The torque converter 22 and the automatic transmission 24 are disposed between the electric motor MG and the drive wheels 14 in the power transmission path. The power transmission apparatus 16 further includes a propeller shaft 28 connected to a transmission output shaft 26 that is an output rotary member of the automatic transmission 24, a differential gear device 30 connected to the propeller shaft 28, and a pair of drive shafts 32 connected to the differential gear device 30. The power transmission apparatus 16 still further includes an engine connection shaft 34 connecting between the engine 12 and the K0 clutch 20, and an electric-motor connection shaft 36 connecting between the K0 clutch 20 and the torque converter 22. It is noted that the automatic transmission 24 corresponds to "transmission" recited in the appended claims.

The electric motor MG is connected to the electric-motor connection shaft 36 in a power transmittable manner in the casing 18. The electric motor MG is disposed in the power transmission path between the engine 12 and the drive wheels 14, so as to be connected to the engine 12 and the drive wheels 14 in a power transmittable manner, more specifically, the electric motor MG is disposed in a power transmission path between the K0 clutch 20 and the torque converter 22, so as to be connected to the K0 clutch 20 and the torque converter 22 in a power transmittable manner. That is, the electric motor MG is connected to the torque converter 22 and the automatic transmission 24 without through the K0 clutch 20 in a power transmittable manner. From another point of view, the torque converter 22 and the automatic transmission 24 constitute respective parts of a power transmission path between the electric motor MG and the drive wheels 14. The torque converter 22 and the automatic transmission 24 transmit a drive power of the engine 12 and/or a drive power of the electric motor MG to the drive wheels 14.

The torque converter 22 includes a pump impeller 22a connected to the electric-motor connection shaft 36, and a turbine impeller 22b connected to a transmission input shaft 38 that is an input rotary member of the automatic transmission 24. The pump impeller 22a is connected to the engine 12 through the K0 clutch 20, and is connected directly to the electric motor MG. The pump impeller 22a is an input member of the torque converter 22, while the turbine impeller 22b is an output member of the torque converter 22. The electric-motor connection shaft 36 serves also as an input rotary member of the torque converter 22. The transmission input shaft 38 serves also as an output rotary member of the torque converter 22, which is formed integrally with a turbine shaft that is to be rotated by the turbine impeller 22b. The torque converter 22 is a fluid-type transmission device, and is configured to transmit the drive powers of the drive power sources in the form of the engine 12 and the electric motor MG, to the transmission input shaft 38, through fluid circulating in the torque converter 22. The torque converter 22 includes an LU clutch 40 configured to connect between the pump impeller 22a and the turbine impeller 22b. The LU clutch 40 is a known lockup clutch serving as a direct connection clutch configured to connect between the input and output rotary members of the torque converter 22.

The LU clutch 40 is configured to receive an LU hydraulic pressure PRlu that is a regulated hydraulic pressure supplied from a hydraulic control unit (hydraulic control circuit) 56 provided in the vehicle 10, whereby an LU torque Tlu, i.e., torque capacity of the LU clutch 40 is changed and its control or operation state is switched. As the operation state of the LU clutch 40, there are a fully released state in which the LU clutch 40 is fully released, a slipped state in which the LU clutch 40 is engaged with slipping, and a fully engaged state in which the LU clutch 40 is fully engaged.

The automatic transmission 24 is a known automatic transmission of a planetary gear type which includes at least one planetary gear device and a plurality of engagement devices CB. Each of the engagement devices CB is a hydraulically-operated frictional engagement device in the form of a multiple-disc type or a single-disc type clutch or brake that is to be pressed by a hydraulic actuator, or a band brake that is to be tightened by a hydraulic actuator. Each of the engagement devices CB is configured to receive a CB hydraulic pressure PRcb that is a regulated hydraulic pressure supplied from the hydraulic control unit 56, whereby a CB torque Tcb, i.e., torque capacity of the engagement device CB is changed and its control or operation state is switched between an engaged state and a released state, for example. The plurality of engagement devices CB includes, for example, four clutches C1-C4 and two brakes B1, B2.

The automatic transmission 24 is a step-variable automatic transmission configured to establish a selected one of a plurality of gear positions, with a corresponding one or ones of the engagement devices CB (clutches C1-C4 and brakes B1, B2) being engaged, wherein the gear positions are different from each other in gear ratio (speed ratios) γat (=AT input rotational speed Ni/AT output rotational speed No). The automatic transmission 24 is configured to switch from one of the gear positions to another one of the gear positions, namely, to establish one of the gear positions which is selected, by the electronic control apparatus 90, depending on, for example, a running speed V of the vehicle 10 and an accelerator opening degree (accelerator operation degree) θacc representing an amount of accelerating operation of an accelerator pedal 42 made by a driver (operator) of the vehicle 10. A determination as to whether a shifting action is to be executed or not in the automatic transmission 24 may be made depending on, in place of or in addition to the accelerator opening degree θacc and the running speed V, a throttle opening degree θth or other values each correlated with the accelerator opening degree θacc and/or the AT output rotational speed No or other values each correlated with the running speed V. The AT input rotational speed Ni is a rotational speed of the transmission input shaft 38, and is an input rotational speed of the automatic transmission 24. The AT input rotational speed Ni is also a rotational speed of the output rotary member of the torque converter 22, and is equal to a turbine rotational speed Nt that is an output rotational speed of the torque converter 22.

Therefore, the AT input rotational speed Ni can be represented by the turbine rotational speed Nt. The AT output rotational speed No is a rotational speed of the transmission output shaft 26, and is an output rotational speed of the automatic transmission 24.

The K0 clutch 20 is disposed between the engine 12 and the electric motor MG, and is a wet-type or dry-type frictional engagement device constituted by a multiple-disc type or single-disc type clutch that is to be pressed by a hydraulic clutch actuator (not shown). With an operation state of the clutch actuator being controlled by the electronic control apparatus 90, a control or operation state of the K0 clutch 20 is switched between an engaged state and a released state, for example. In the K0 clutch 20, when a regulated K0 hydraulic pressure PRK0 is supplied from the hydraulic control unit 56 to the hydraulic clutch actuator, a K0 torque Tk0, which is a torque capacity of the K0 clutch 20, is changed whereby the operation state of the K0 clutch 20 is switched. It is noted that the K0 clutch 20 corresponds to "frictional engagement device" recited in the appended claims.

When the K0 clutch 20 is engaged, the pump impeller 22a and the engine 12 are to be rotated integrally with each other through the engine connection shaft 34. That is, the K0 clutch 20 connects between the engine 12 and the drive wheels 14 in a power transmittable manner, when being engaged. On the other hand, when the K0 clutch 20 is released, transmission of a power between the engine 12 and the pump impeller 22a is interrupted. That is, the K0 clutch 20 separates connection between the engine 12 and the drive wheels 14, when being released. The K0 clutch 20 is disposed in the power transmission path between the engine 12 and the electric motor MG that is connected to the pump impeller 22a, and serves as a clutch configured to cut off the power transmission path between the engine 12 and the electric motor MG, namely, to disconnect the engine 12 from the electric motor MG. That is, the K0 clutch 20 is a clutch configured to connect between the engine 12 and the electric motor MG, when being engaged, and to separate the connection between the engine 12 and the electric motor MG, when being released.

In the power transmission apparatus 16, the power outputted from the engine 12 is transmitted, when the K0 clutch 20 is engaged, to the drive wheels 14 from the engine connection shaft 34 through sequentially the K0 clutch 20, electric-motor connection shaft 36, torque converter 22, automatic transmission 24, propeller shaft 28, differential gear device 30 and drive shafts 32, for example. Further, the power transmitted from the electric motor MG is transmitted, irrespective of the operation state of the K0 clutch 20, to the drive wheels 14 from the electric-motor connection shaft 36 through sequentially the torque converter 22, automatic transmission 24, propeller shaft 28, differential gear device 30 and drive shafts 32, for example.

The vehicle 10 further includes an MOP 58 that is a mechanically-operated oil pump, an EOP 60 that is an electrically-operated oil pump, and a pump motor 62. The MOP 58 is connected to the pump impeller 22a, and is to be rotated and driven by the drive power source or sources (i.e., engine 12 and/or electric motor MG), so as to output a working fluid OIL that is to be used in the power transmission apparatus 16. The pump motor 62 is a motor serving exclusively to rotate and drive the EOP 60. The EOP 60 outputs the working fluid OIL, when being rotated and driven by the pump motor 62. The working fluid OIL outputted by the MOP 58 and the EOP 60 is supplied to the hydraulic control unit 56. The hydraulic control unit 56, which receives the working fluid OIL as an original hydraulic pressure outputted from the MOP 58 and/or the EOP 60, supplies regulated hydraulic pressures that serve as the CB hydraulic pressure PRcb, the K0 hydraulic pressure PRK0 and the LU hydraulic pressure PRlu, for example.

The vehicle 10 is provided with the electronic control apparatus 90 as a controller including the control apparatus that is configured to control running of the vehicle 10, for example. The electronic control apparatus 90 includes a so-called microcomputer incorporating a CPU, a ROM, a RAM and an input-output interface. The CPU performs various control operations of the vehicle 10, by processing various input signals, according to control programs stored in the ROM, while utilizing a temporary data storage function of the RAM. The electronic control apparatus 90 includes a plurality of ECUs such as an engine control ECU for controlling an output of the engine 12 and an electric-motor control ECU for controlling the electric motor MG.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne that is a rotational speed of the engine 12; an output signal of a turbine speed sensor 72 indicative of a turbine rotational speed Nt that is equal to the AT input rotational speed Ni; an output signal of an output speed sensor 74 indicative of the AT output rotational speed No corresponding to the vehicle running speed V; an output signal of an MG speed sensor 76 indicative of the motor rotational speed Nm; an output signal of an accelerator-opening degree sensor 78 indicative of the accelerator opening degree (accelerator operation degree) θacc representing the amount of accelerating operation made by the vehicle driver; an output signal of a throttle-opening degree sensor 80 indicative of a throttle opening degree θth which is an opening degree of an electronic throttle valve; an output signal of a brake switch 82 indicative of a signal representing a state in which a brake pedal is being operated by the vehicle driver so as to operate wheel brakes; an output signal of a battery sensor 84 indicative of a battery temperature THbat, a battery charging/discharging electric current Ibat and a battery voltage Vbat; an output signal of a fluid temperature sensor 86 indicative of a working-fluid temperature THoil that is a temperature of the working fluid OIL in the hydraulic control unit 56; and an output signal of a shift position sensor 88 indicative of a shift operation position POSsh that is to be changed by a shift operation device 64.

The electronic control apparatus 90 generates various output signals to the various devices provided in the vehicle 10, such as: an engine control command signal Se that is to be supplied to the engine control device 50 for controlling the engine 12, an MG control command signal Sm that is to be supplied to the inverter 52 for controlling the electric motor MG; a CB hydraulic control command signal Scb that is to be supplied to the hydraulic control unit 56 for controlling the operation states of the engagement devices CB; a K0 hydraulic control command signal Sko that is to be supplied to the hydraulic control unit 56 for controlling the K0 clutch 20; an LU hydraulic control command signal Slu that is to be supplied to the hydraulic control unit 56 for controlling the operation state of the LU clutch 40; and an EOP control command signal Seop that is to be supplied to the pump motor 62 for controlling the EOP 60.

For performing various control operations in the vehicle 10, the electronic control apparatus 90 includes a hybrid control means in the form of a hybrid control portion 92, a clutch control means in the form of a clutch control portion 94, and a shift control means in the form of a shift control portion 96.

The hybrid control portion 92 has a function serving as an engine control means in the form of an engine control portion 92a for controlling operation of the engine 12 and a function serving as an electric-motor control means in the form of an electric-motor control portion 92b for controlling operation of the electric motor MG through the inverter 52, and executes a hybrid-drive control operation, for example, using the engine 12 and the electric motor MG through these control functions.

The hybrid control portion 92 calculates a requested drive amount of the vehicle 10 requested by the vehicle driver, by applying the accelerator opening degree θacc and the vehicle running speed V, for examples, to a requested drive amount map that represents a pre-stored relationship obtained by experimentation or determined by an appropriate design theory. The requested drive amount is, for example, a requested drive torque Trdem of the drive wheels 14. From another point of view, the requested drive torque Trdem [Nm] is a requested drive power Proem [W] at the current vehicle running speed V. As the requested drive amount, another value such as a requested drive force Frdem [N] of the drive wheels 14 and a requested AT output torque of the transmission output shaft 26 may be used, too. In the calculation of the requested drive amount, it is also possible to use, for example, the AT output rotational speed No in place of the vehicle running speed V.

The hybrid control portion 92 calculates a target engine torque Tedem of the engine 12 and a target MG torque Tmdem of the electric motor MG, which cooperate with each other to realize the requested drive torque Trdem, by taking account of various factors such as a transmission loss, an auxiliary load, the gear ratio yat of the automatic transmission 24 and a maximum chargeable amount Win and a maximum dischargeable amount Wout of the battery 54. The hybrid control portion 92 outputs an engine control command signal Se by which the engine 12 is caused to output the calculated target engine torque Tedem, and the outputted engine control command signal Se is supplied to the engine control device 50. Further, the hybrid control portion 92 outputs an MG control command signal Sm by which the electric motor MG is caused to output the calculated target MG torque Tmdem, and the outputted MG control command signal Sm is supplied to the inverter 52. The engine control command signal Se is, for example, a command value of an engine power Pe that is the power of the engine 12 outputting the target engine torque Tedem at the current engine rotational speed Ne. The MG control command signal Sm is, for example, a command value of a consumed electric power Wm of the electric motor MG outputting the target MG torque Tmdem at the current motor rotational speed Nm.

The maximum chargeable amount Win of the battery 54 is a maximum amount of the electric power that can be charged to the battery 54, and represents a limitation of the electric power inputted to the battery 54, namely, a limitation of input to the battery 54. The maximum dischargeable amount Wout of the battery 54 is a maximum amount of the electric power that can be discharged from the battery 54, and represents a limitation of the electric power outputted from the battery 54, namely, a limitation of output of the battery 54. The maximum chargeable and dischargeable amounts Win, Wout are calculated by the electronic control apparatus 90, for example, based on the battery temperature THbat and a state-of-charge value SOC [%] of the battery 54. The state-of-charge value SOC of the battery 54 is a value indicative of a charged state of the battery 54, i.e., an amount of the electric power stored or remaining in the battery 54, and is calculated by the electronic control apparatus 90, for example, based on the charging/discharging electric current Ibat and the voltage Vbat of the battery 54.

When the requested drive torque Trdem can be covered by only the output of the electric motor MG, the hybrid control portion 92 establishes a motor driving (=BEV driving) mode as a driving mode. When the BEV driving mode is established, the hybrid control portion 92 causes the vehicle 10 to perform a BEV driving (electric motor driving) with the K0 clutch 20 being released and with only the electric motor MG serving as the drive power source. On the other hand, when the requested drive torque Trdem cannot be covered without at least the output of the engine 12, the hybrid control portion 92 establishes another driving mode that is an engine driving mode, i.e., a hybrid driving (=HEV driving) mode.

When the HEV driving mode is established, the hybrid control portion 92 causes the vehicle 10 to perform an engine driving, i.e., an HEV driving (hybrid driving) with the K0 clutch 20 being engaged and with the engine 12 and the electric motor MG serving as the drive power sources. Further, even when the requested drive torque Trdem can be covered by only the output of the electric motor MG, the hybrid control portion 92 establishes the HEV driving mode, for example, in a case in which the state-of-charge value SOC of the battery 54 becomes less than a predetermined engine-start threshold value or in a case in which the engine 12 or other component needs to be warmed up. The engine-start threshold value is a predetermined threshold value for determining that the state-of-charge value SOC reaches a level at which the engine 12 must forcibly be started for charging the battery 54. Thus, the hybrid control portion 92 switches between the BEV driving mode and the HEV driving mode, based on, for example, the requested drive torque Trdem, by automatically stopping the engine 12 during the HEV driving, restarting the engine 12 after the stop of the engine 12, and staring the engine 12 during the BEV driving.

The clutch control portion 94 controls the K0 clutch 20, depending on the currently established driving mode. For example, when it is determined during the BEV driving that the HEV driving mode is to be established, the clutch control portion 94 executes a control operation for engaging the K0 clutch 20 so as to execute a control operation for starting the engine 12. For example, when it is determined based on a running state of the vehicle 10 that start of the engine 12 is requested, the clutch control portion 94 outputs the K0 hydraulic control command signal Sko that is supplied to the hydraulic control unit 56, wherein the K0 hydraulic control command signal Sko is for switching the K0 clutch 20 from the released state to the engaged state so as to obtain the K0 torque Tk0 that makes it possible to transmit a cranking torque Torn (i.e., torque required to increase the engine rotational speed Ne for cranking the engine 12) to the engine 12.

The shift control portion 96 determines whether a shifting action is to be executed in the automatic transmission 24, by using, for example, a shifting map that represents a predetermined relationship, and outputs the CB hydraulic control command signal Scb, as needed, which is supplied to the hydraulic control unit 56, for executing the shifting action in the automatic transmission 24. In the shifting map, the predetermined relationship is represented by shifting lines in two-dimensional coordinates in which the vehicle running speed V and the accelerator opening degree θacc as two variables are taken along respective two axes, wherein the shifting lines are used for the determination as to whether the shifting action is to be executed in the automatic transmission 24. In the shifting map, one of the two variables may be the AT output rotational speed No in place of the vehicle running speed V, and the other of the two variables may be any one of the requested drive force Frdem, requested drive torque Trdem and throttle opening degree θth in place of the accelerator opening degree θacc.

The hybrid control portion 92 further has a function serving as an engine-start control means in the form of an engine-start control portion 92c configured to start the engine 12. The engine-start control portion 92c controls the engine 12 and the electric motor MG to execute an engine-start control operation for starting the engine 12. For example, when determining that the starting of the engine 12 is requested, the engine-start control portion 92c is configured, upon switching of the K0 clutch 20 to the engaged state, to supply, to the inverter 52, the MG control command signal Sm requesting the electric motor MG to output the required cranking torque Tcrn. That is, when the engine 12 is to be started, the engine-start control portion 92c supplies, to the inverter 52, the MG control command signal Sm by which the electric motor MG is controlled to output the required cranking torque Tcrn, namely, by which the MG torque Tm is increased by an amount corresponding to the required cranking torque Tcrn. With the K0 clutch 20 being engaged, the cranking torque Tcrn outputted from the electric motor MG is transmitted to the engine 12 through the engaged K0 clutch 20 to the engine 12 whereby the engine rotational speed Ne is increased. Further, when the engine rotational speed Ne has been increased to a predetermined value, the engine-start control portion 92c causes the engine 12 to be started, by injecting fuel into a combustion chamber of the engine 12 and then igniting the fuel.

Figure 2:
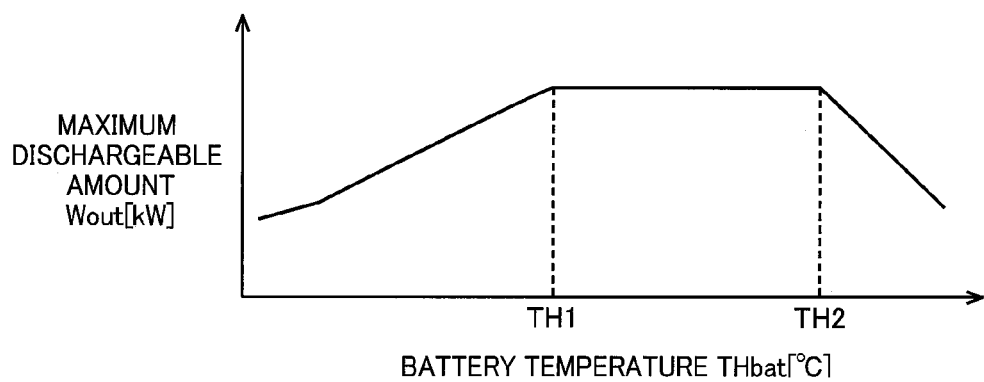
FIG. 2 is a view showing a relationship between a battery temperature and a maximum dischargeable amount.

By the way, in a stage of start of the engine 12, the maximum dischargeable amount Wout outputtable from the battery 54 is changed depending on the battery temperature THbat and the state-of-charge value SOC that corresponds to the amount of the electric power stored or remaining in the battery 54. FIG. 2 is a view showing a relationship between the battery temperature THbat and the maximum dischargeable amount Wout. As shown in FIG. 2, when the battery temperature THbat is not higher than a predetermined low threshold value TH1, the maximum dischargeable amount Wout is reduced as the battery temperature THbat is reduced. Further, when the battery temperature THbat is not lower than a predetermined high threshold value TH2, the maximum dischargeable amount Wout is reduced as the battery temperature THbat is increased. Still further, although being not shown, the maximum dischargeable amount Wout is reduced as the state-of-charge value SOC of the battery 54 is reduced.

When the engine 12 is started in a state in which the maximum dischargeable amount Wout has been reduced, the electric power available for starting the engine 12 becomes insufficient whereby the MG torque Tm (i.e., cranking torque Tcrn) of the electric motor MG becomes insufficient, so that there is a risk of shock (pull-in shock) caused due to insufficiency of the cranking torque Tcrn in process of starting the engine 12. The shock can be avoided by inhibiting intermittent operation of the engine 12 in event of reduction of the maximum dischargeable amount Wout, for preventing the shock that could be caused in the process of starting the engine 12. The intermittent operation of the engine 12 is an operation in which the engine 12 is allowed to be stopped and started during operation of the vehicle 10.

The hybrid control portion 92 further has a function serving as an intermittent-operation-inhibition determining means in the form of an intermittent-operation-inhibition determining portion 92d configured to determine whether the intermittent operation of the engine 12 is to be inhibited or not. The intermittent-operation-inhibition determining portion 92d sets an intermittent-operation-inhibition threshold value α, which is a determination threshold value for determination as to whether the intermittent operation of the engine 12 is to be inhibited or not. Further, the intermittent-operation-inhibition determining portion 92d determines whether the current maximum dischargeable amount Wout of the battery 54 is smaller than the intermittent-operation-inhibition threshold value α or not. The intermittent-operation-inhibition determining portion 92d does not inhibit the intermittent operation of the engine 12, when the maximum dischargeable amount Wout is larger than the intermittent-operation-inhibition threshold value α. That is, the intermittent operation of the engine 12 is allowed and enabled. It is noted that the intermittent-operation-inhibition threshold value α corresponds to "threshold value" recited in the appended claims.

On the other hand, when the maximum dischargeable amount Wout is not larger than the intermittent-operation-inhibition threshold value α, the intermittent-operation-inhibition determining portion 92d inhibits the intermittent operation of the engine 12. For example, in a case in which the engine 12 is in its driving state when the intermittent operation of the engine 12 is inhibited, the driving state of the engine 12 is maintained. In a case in which the engine 12 is in its stopped state when the intermittent operation of the engine 12 is inhibited, the engine 12 starts to be driven. Thus, the stop of the engine 12 is practically inhibited in a case in which the maximum dischargeable amount Wout becomes not larger than the intermittent-operation-inhibition threshold value α and the intermittent operation of the engine 12 is inhibited.

The intermittent operation of the engine 12 would be easily inhibited, if the intermittent-operation-inhibition threshold value α, which is the determination threshold value used for the determination as to whether the intermittent operation of the engine 12 is to be inhibited or not, were large. Consequently, it could be possible to avoid the shock caused upon start of the engine 12 by inhibiting the engine 12 from being stopped, but the inhibition of the stop of the engine 12 increases a time of driving of the engine 12, resulting in a risk of reduction of fuel economy. On the other hand, it is possible to suppress the shock caused upon start of the engine 12 while suppressing the reduction of fuel economy, with the intermittent-operation-inhibition threshold value α being determined as described below.

Prior to determination of the intermittent-operation-inhibition threshold value α, a start-case-required electric power Wneed, which is required to start the engine 12, is obtained. The start-case-required electric power Wneed is calculated by adding a cranking electric power Wne, a backlash-eliminating electric power Wgap and an auxiliary-devices electric power Wast to one another (Wneed=Wne+Wgap+Wast), wherein the cranking electric power Wne is an electric power required to increase the engine rotational speed Ne to the MG rotational speed Nm by the electric power MG during a coast running of the vehicle 10, namely, required to enable the electric motor MG to generate the cranking torque Tcrn, the backlash-eliminating electric power Wgap is an electric power required to eliminate backlash (gap) between gears that constitute the power transmission path between the drive power sources (engine 12 and electric motor MG) and the drive wheels 14 when the vehicle 10 is switched from a driven state to the driving state, and the auxiliary-devices electric power Wast is an electric power to be consumed by auxiliary devices (such as an air conditioner) provided in the vehicle 10. It is noted that the coast running is a running by inertia of the vehicle 10 with the accelerator pedal 42 being released from stepping by the vehicle driver. It is noted that the above-described a cranking electric power Wne, backlash-eliminating electric power Wgap and auxiliary-devices electric power Wast correspond to "first required electric power", "second required electric power" and "third required electric power", respectively, which are recited in the appended claims.

When the start-case-required electric power Wneed calculated upon start of the engine 12 is ensured, it is possible to prevent the shock caused due to insufficiency of the cranking torque Tcrn that is outputted from the electric motor MG when the engine rotational speed Ne is to be increased to the MG rotational speed Nm. Further, it is possible to suppress the shock caused when the backlash between the various gears provided in the power transmission apparatus 16 is eliminated. Still further, it is possible to suppress problem (such as performance reduction of the air conditioner) due to insufficiency of the electric power supplied to the air conditioner and the other auxiliary devices. Therefore, it is preferable the intermittent-operation-inhibition threshold value α is set to be not smaller than the start-case-required electric power Wneed, so that the start-case-required electric power Wneed is ensured upon start of the engine 12.

On the other hand, where the intermittent-operation-inhibition threshold value α is made sufficiently larger than the start-case-required electric power Wneed, the start-case-required electric power Wneed can be reliably ensured upon start of the engine 12. However, since the intermittent operation of the engine 12 is easily limited, a region in which the BEV driving can be practiced is practically reduced whereby the fuel economy is reduced. Therefore, the intermittent-operation-inhibition threshold value α is not smaller than a start-case-required electric power Wneed required to start the engine 12 such that a difference value δ (=|α−Wneed|) between the threshold value α and the start-case-required electric power Wneed is not larger than a predetermined value M. The predetermined value M is pre-obtained by an experimentation or an appropriate design theory, such that the predetermined value M is set to a value that makes it possible to ensure a certain degree of acceleration performance upon start of the engine 12 and to suppress reduction of the fuel economy which is caused by increase of the intermittent-operation-inhibition threshold value α.

Figure 3:
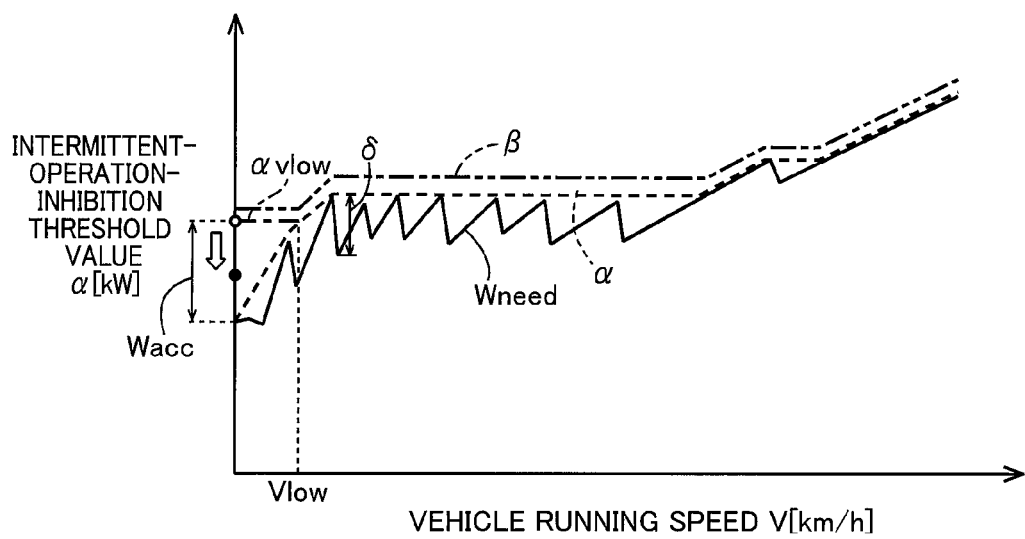
FIG. 3 is a relationship map showing a relationship between a vehicle running speed and an intermittent-operation-inhibition threshold value.

FIG. 3 is a relationship map showing a relationship between the vehicle running speed V and the determined intermittent-operation-inhibition threshold value α. The relationship map of FIG. 3 is pre-obtained by an experimentation or an appropriate design theory, and is stored in the electronic control apparatus 90. In FIG. 3, its horizontal axis represents the running speed V [km/h] while its vertical axis represents various values of the electric power such as the intermittent-operation-inhibition threshold value α [kW]. Further, in FIG. 3, broken line represents the intermittent-operation-inhibition threshold value α used in the coast running, and two-dot chain line represents an intermittent-operation-allowance threshold value β that is a determination threshold value for determination as to whether the intermittent operation of the engine 12 is to be allowed or not, in a state in which the intermittent operation has been inhibited. As shown in FIG. 3, the intermittent-operation-inhibition threshold value α and the intermittent-operation-allowance threshold value β are set such that a gap or hysteresis is provided between the intermittent-operation-inhibition threshold value α and the intermittent-operation-allowance threshold value β. Owing to provision of the hysteresis between the intermittent-operation-inhibition threshold value α and the intermittent-operation-allowance threshold value β, it is possible to prevent frequent switch between inhibition and allowance of the intermittent operation of the engine 12 and accordingly to prevent a so-called "hunting" that is frequent repeat of start and stop of the engine 12.

The start-case-required electric power Wneed, which is represented by solid line in FIG. 3, is calculated by adding the above-described cranking electric power Wne, backlash-eliminating electric power Wgap and auxiliary-devices electric power Wast to one another (Wneed=Wne+Wgap+Wast). As shown in FIG. 3, the start-case-required electric power Wneed is increased generally in proportion with the running speed V. During the coast running, the start-case-required electric power Wneed is fluctuated because the AT input rotational speed Ni of the automatic transmission 24 is temporarily increased each time when a shift-down action is executed in the automatic transmission 24 during the coast running. Thus, the AT input rotational speed Ni is temporarily increased each time when the shift-down action is executed in the automatic transmission 24, and the cranking electric power Wne required to increase the engine rotational speed Ne to the MG rotational speed Nm is increased with increase of the AT input rotational speed Ni. The start-case-required electric power Wneed is fluctuated as a result of the shift-down actions executed during the coast running.

In FIG. 3, the broken line represents the intermittent-operation-inhibition threshold value α that is set based on the start-case-required electric power Wneed represented by the solid line. The intermittent operation of the engine 12 is more easily inhibited as the intermittent-operation-inhibition threshold value α is set to be larger. Thus, by setting the intermittent-operation-inhibition threshold value α to a larger value, the electric power is more easily ensured thereby making it possible to avoid the shock that could be generated upon start of the engine 12. However, with the intermittent-operation-inhibition threshold value α being set to a larger value, the engine 12 is less likely to be stopped whereby the fuel economy is reduced. On the other hand, by setting the intermittent-operation-inhibition threshold value α to a smaller value, the intermittent operation of the engine 12 is more easily allowed thereby making it possible to increase the fuel economy owing to increase of time of stop of the engine 12. However, with the intermittent-operation-inhibition threshold value α being set to a smaller value, the shock could be more easily generated upon start of the engine 12, due to insufficiency of the electric power. For example, if the intermittent-operation-inhibition threshold value α is set to a value smaller than the start-case-required electric power Wneed represented by solid line, there is a risk of the shock upon start of the engine 12, due to insufficiency of the electric power. Therefore, it is preferable that the intermittent-operation-inhibition threshold value α is set to the same value as the start-case-required electric power Wneed or set to a value larger than the start-case-required electric power Wneed, as shown in FIG. 3 in which the intermittent-operation-inhibition threshold value α represented by the broken line is the same as or larger than the start-case-required electric power Wneed in all ranges of the running speed V. When the intermittent-operation-inhibition threshold value $\alpha$ is larger than the start-case-required electric power Wneed, the difference value $\delta$ (=$\alpha$−Wneed|) between the intermittent-operation-inhibition threshold value $\alpha$ and the start-case-required electric power Wneed is not larger than the predetermined value M.

Where the intermittent-operation-inhibition threshold value $\alpha$ is set to the same value as the start-case-required electric power Wneed, the intermittent operation is allowed at least in a range in which the electric power required upon start of the engine 12 is ensured, whereby the shock is prevented upon start of the engine 12. However, in FIG. 3, in a range in which the start-case-required electric power Wneed is fluctuated due to the shift-down actions executed in the automatic transmission 24, the maximum dischargeable amount Wout could frequently straddle the intermittent-operation-inhibition threshold value $\alpha$, so that the inhibition and allowance of the intermittent operation of the engine 12 could be alternately repeated, thereby causing a risk of the above-described hunting that is frequent repeat of start and stop of the engine 12. For avoiding such a hunting, the intermittent-operation-inhibition threshold value $\alpha$ is set to a value that is constant or increased as the running speed V is increased, without being reduced as the running speed V is increased, as represented by the broken line in FIG. 3. In other words, the intermittent-operation-inhibition threshold value $\alpha$ is generally increased as the running speed V is increased, in all ranges of the running speed V. Thus, even in the range in which the start-case-required electric power Wneed is fluctuated due to the shift-down actions executed in the automatic transmission 24, there is no risk that maximum dischargeable amount Wout would frequently straddle the intermittent-operation-inhibition threshold value $\alpha$, so that the above-described hunting is suppressed.

Further, when the vehicle 10 is to be re-accelerated from a low range of the running speed V in which the vehicle 10 is about to be stopped, a quick acceleration is desired and accordingly a sufficient acceleration performance is desired. Therefore, for ensuring the acceleration performance of the vehicle 10 when the vehicle 10 is to be accelerated from the low range of the running speed V, an acceleration-case-required electric power Wacc (that is required for the acceleration) is added to the intermittent-operation-inhibition threshold value $\alpha$ in the low range of the running speed V in which the running speed V is not higher than a predetermined speed value Vlow, as represented by one-dot chain line in FIG. 3. That is, in the low range of the running speed V in which the running speed V is not higher than the predetermined speed value Vlow, the intermittent-operation-inhibition threshold value $\alpha$ is set to an intermittent-operation-inhibition threshold value $\alpha$vlow in which the acceleration-case-required electric power Wacc is added to the start-case-required electric power Wneed. Thus, even during the BEV driving or upon start of the engine 12 in the low range of the running speed V, it is possible to ensure the electric power sufficiently for assuring the acceleration performance and to ensure the acceleration performance of the vehicle 10. It is noted that the acceleration-case-required electric power Wacc required for the acceleration is pre-obtained by an experimentation or an appropriate design theory, such that the acceleration-case-required electric power Wacc is set to a value that makes it possible to provide the quick acceleration performance that is desired by the vehicle driver when the vehicle 10 is accelerated from the low range of the running speed V. For example, as shown in FIG. 3, the intermittent-operation-inhibition threshold value $\alpha$vlow is set to a value that is obtained by adding the acceleration-case-required electric power Wacc to the start-case-required electric power Wneed when the running speed V is zero. Further, the above-described predetermined speed value Vlow as a threshold value of the low range of the running speed V in which the acceleration-case-required electric power Wacc is added, is also pre-obtained by an experimentation or an appropriate design theory, such that the low range of the running speed V defined by the predetermined speed value Vlow corresponds to a range of the running speed V in which the quick acceleration is required.

Further, when the vehicle 10 is stopped with the running speed V being zero, the intermittent-operation-inhibition threshold value $\alpha$ is changed depending on a brake depressing force Fbrk applied to a brake pedal 44. When the running speed V is zero, it is considered that an intention of the vehicle driver to start running of the vehicle 10 is smaller as the brake depressing force Fbrk applied to the brake pedal 44 is larger. Therefore, the intermittent-operation-inhibition threshold value $\alpha$ is set to a value that is made smaller as the brake depressing force Fbrk applied to the brake pedal 44 is made larger.

Figure 4:
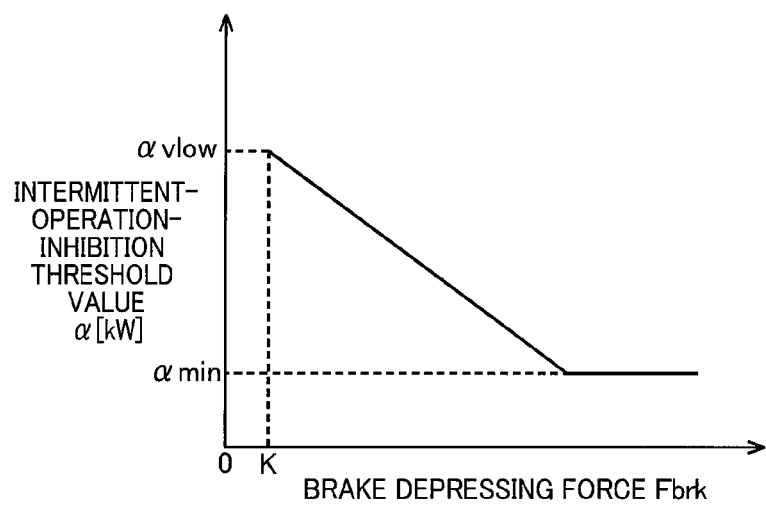
FIG. 4 is a relationship map showing a relationship between a brake depressing force and the intermittent-operation-inhibition threshold value.

FIG. 4 is a relationship map showing a relationship between the brake depressing force Fbrk and the intermittent-operation-inhibition threshold value $\alpha$. The relationship map of FIG. 4 is pre-obtained by an experimentation or an appropriate design theory, and is stored in the electronic control apparatus 90. In FIG. 4, its horizontal axis represents the brake depressing force Fbrk applied to the brake pedal 44 while its vertical axis represents the intermittent-operation-inhibition threshold value $\alpha$ when the running speed V is zero. As shown in FIG. 4, when the brake depressing force Fbrk is larger than a predetermined value K, the intermittent-operation-inhibition threshold value $\alpha$ is smaller as the brake depressing force Fbrk is larger. Further, when the brake depressing force Fbrk is equal to the predetermined value K, the intermittent-operation-inhibition threshold value $\alpha$ is set to, for example, the above-described intermittent-operation-inhibition threshold value $\alpha$vlow to which the intermittent-operation-inhibition threshold value $\alpha$ is set in the low range of the running speed V. The above-described predetermined value K is pre-obtained by an experimentation or an appropriate design theory, such that the predetermined value K corresponds to a threshold value of a range of the brake depressing force Fbrk in which it is presumed that the vehicle driver has an intention to stop the vehicle 10, for example.

When the running speed V is zero, the start-case-required electric power Wneed, which is required upon start of the engine 12, corresponds to a sum (=Wne+Wast) of the cranking electric power Wne (that is required to generate the cranking torque Torn) and the auxiliary-devices electric power Wast (that is required by the auxiliary devices such as the air conditioner). Therefore, a minimum value amin of the intermittent-operation-inhibition threshold value $\alpha$ is set to, for example, the above-described sum (=Wne+Wast). Thus, when the running speed V is zero, the intermittent-operation-inhibition threshold value $\alpha$ is changeable within a range between the minimum value amin and the intermittent-operation-inhibition threshold value $\alpha$vlow in the low range of the running speed V. Specifically described, the intermittent-operation-inhibition threshold value $\alpha$, which is changeable within the range between the minimum value $\alpha$min and the intermittent-operation-inhibition threshold value $\alpha$vlow, is made smaller as the brake depressing force Fbrk applied to the brake pedal 44 is made larger. Further, by taking account of a possible case that the accelerator pedal 42 is depressed immediately after the brake pedal 44 is released from the stopped state of the vehicle 10, the electric power required for the acceleration in such a possible case may be added to the intermittent-operation-inhibition threshold value α.

Further, when the shift operation position POSsh that is to be changed by the shift operation device 64 is a P position (parking position) as a vehicle stop position, the intermittent-operation-inhibition threshold value α is set to a minimum value (to which the intermittent-operation-inhibition threshold value α is to be set when the vehicle 10 is being stopped), irrespective of the brake depressing force Fbrk applied to the brake pedal 44, so that the engine 12 is likely to be stopped. When the shift operation position Psh is the P position, the vehicle 10 is unlikely to be started to run, so that reduction of the fuel economy can be suppressed, with the intermittent-operation-inhibition threshold value α being reduced so as to cause the engine 12 to be easily stopped. The minimum value of the intermittent-operation-inhibition threshold value α, which is used when the vehicle 10 is being stopped with the shift operation position POSsh being the P position, may be, for example, the above-described minimum value αmin that is used when the brake depressing force Fbrk is sufficiently large.

The intermittent-operation-inhibition determining portion 92d determines whether the vehicle 10 is in the coast running or not. When the vehicle 10 is in the coast running, the intermittent-operation-inhibition determining portion 92d selects the intermittent-operation-inhibition threshold value α shown in FIG. 3. On the other hand, when the vehicle 10 is not in the coast running, the intermittent-operation-inhibition determining portion 92d determines whether the vehicle 10 is being stopped or not. When the vehicle 10 is not being stopped, the intermittent-operation-inhibition determining portion 92d selects a normal-case intermittent-operation-inhibition threshold value α by which a higher priority is given to prevention of the shock upon start of the engine 12, rather than to reduction of the fuel economy due to driving of the engine 12. The normal-case intermittent-operation-inhibition threshold value α is set to a value sufficiently larger than the intermittent-operation-inhibition threshold value α that is shown in FIG. 3.

On the other hand, when the vehicle 10 is being stopped, the intermittent-operation-inhibition determining portion 92d sets the intermittent-operation-inhibition threshold value α, depending on the shift operation position Psh and the brake depressing force Fbrk. The intermittent-operation-inhibition determining portion 92d determines whether the shift operation position Psh is the P position or not. When the shift operation position Psh is the P position, the intermittent-operation-inhibition determining portion 92d selects the intermittent-operation-inhibition threshold value α for a case in which the shift operation position Psh is the P position. For example, the minimum value αmin, which is used when the brake pedal 44 is largely depressed, is used as the intermittent-operation-inhibition threshold value α for the case in which the shift operation position Psh is the P position.

When the shift operation position Psh is a position other than the P position, the intermittent-operation-inhibition determining portion 92d determines whether the vehicle driver is without an intention to accelerate the vehicle 10 or not, depending on whether the accelerator opening degree θacc (corresponding to an operating mount of the accelerator pedal 42) is zero or not. When the accelerator opening degree θacc is larger than zero, the intermittent-operation-inhibition determining portion 92d determines that the vehicle driver has the intention to accelerate the vehicle 10, and selects the above-described normal-case intermittent-operation-inhibition threshold value α. On the other hand, when the accelerator opening degree θacc is zero, the intermittent-operation-inhibition determining portion 92d determines that the vehicle driver does not have the intention to accelerate the vehicle 10, and sets the intermittent-operation-inhibition threshold value α depending on the brake depressing force Fbrk. The intermittent-operation-inhibition determining portion 92d determines whether the brake depressing force Fbrk is equal or larger than the predetermined value K. When the brake depressing force Fbrk is not smaller than the predetermined value K, the intermittent-operation-inhibition determining portion 92d sets the intermittent-operation-inhibition threshold value α, in accordance with the relationship map shown in FIG. 4. On the other hand, when the brake depressing force Fbrk is smaller than the predetermined value K, the intermittent-operation-inhibition determining portion 92d selects the normal-case intermittent-operation-inhibition threshold value α.

After setting the intermittent-operation-inhibition threshold value α, the intermittent-operation-inhibition determining portion 92d determines whether the current maximum dischargeable amount Wout is smaller than the set intermittent-operation-inhibition threshold value α or not. When the maximum dischargeable amount Wout is smaller than the set intermittent-operation-inhibition threshold value α, the intermittent-operation-inhibition determining portion 92d inhibits the intermittent operation of the engine 12. When the maximum dischargeable amount Wout is not smaller than the intermittent-operation-inhibition threshold value α, the intermittent-operation-inhibition determining portion 92d does not inhibit the intermittent operation of the engine 12.

Figure 5:
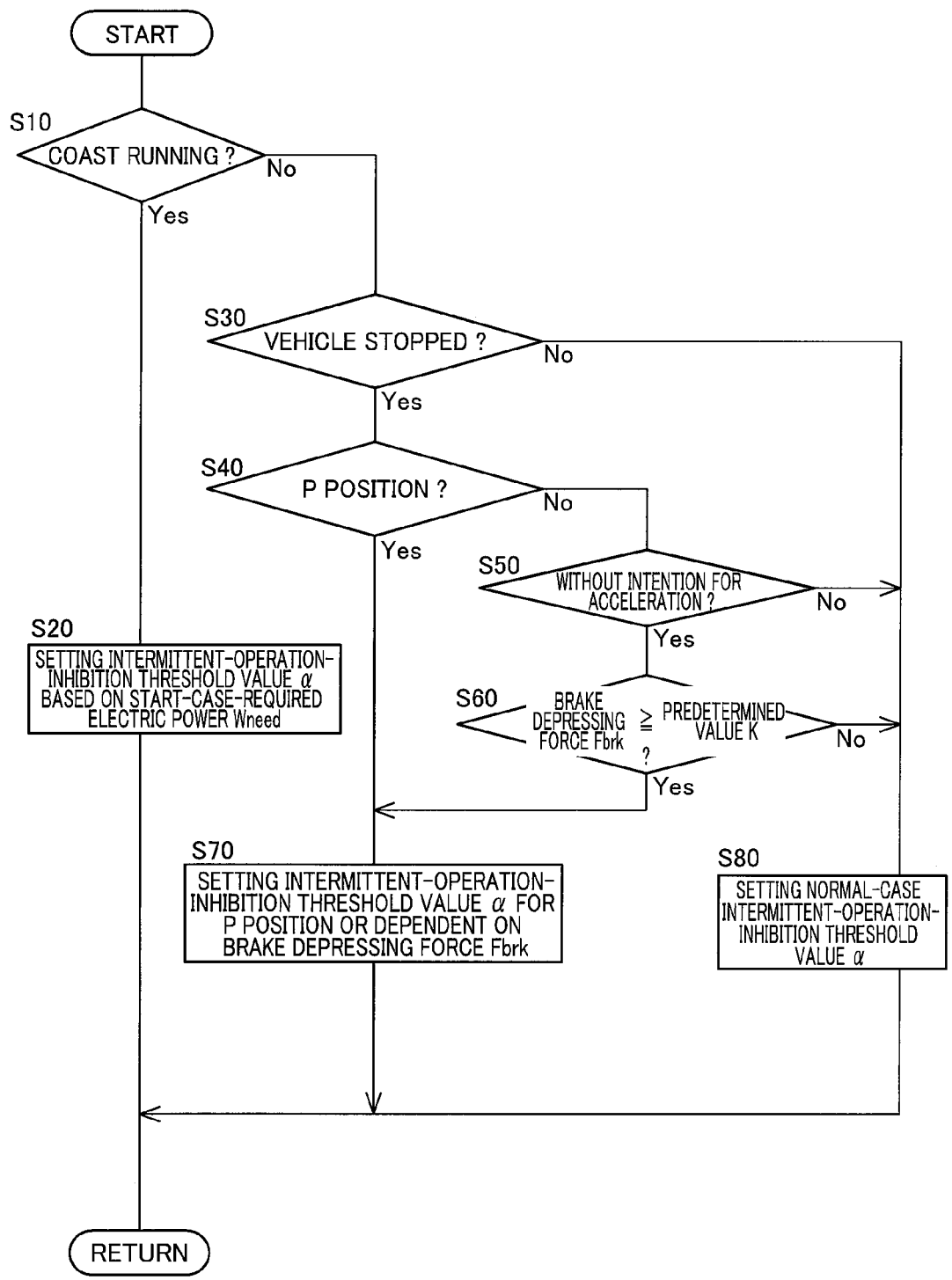
FIG. 5 is a flow chart showing a main part of a control routine executed by an electronic control apparatus, namely, a control routine that is executed for setting the intermittent-operation-inhibition threshold value that makes it possible to suppress reduction of fuel economy and to prevent shock caused by insufficiency of an electric power upon start of an engine.

FIG. 5 is a flow chart showing a main part of a control routine executed by the electronic control apparatus 90, namely, a control routine that is executed for setting the intermittent-operation-inhibition threshold value α that makes it possible to suppress reduction of the fuel economy and to prevent the shock caused by insufficiency of the electric power upon start of an engine 12. This control routine is executed in a repeated manner during operation of the vehicle 10.

The control routine is initiated with step S10 corresponding to control function of the intermittent-operation-inhibition determining portion 92d, which is implemented to determine whether the vehicle 10 is in the coast running or not. This determination as to whether the vehicle 10 is in the coast running or not is made depending on, for example, the running speed V and the accelerator opening degree θacc. When an affirmative determination is made at step S10, step S10 is followed by step S20 corresponding to control function of the intermittent-operation-inhibition determining portion 92d, which is implemented to set the intermittent-operation-inhibition threshold value α, in accordance with the relationship map of FIG. 3 that is used during the coast running. On the other hand, when a negative determination is made at step S10, the control flow goes to step S30 corresponding to control function of the intermittent-operation-inhibition determining portion 92d, which is implemented to determine whether the vehicle 10 is being stopped or not. When a negative determination is made at step S30, the control flow goes to step S80 that is implemented to set the normal-case intermittent-operation-inhibition threshold value α.

When an affirmative determination is made at step S30, step S40 corresponding to control function of the intermittent-operation-inhibition determining portion 92d is implemented to determine whether the shift operation position Psh is the P position or not. When an affirmative determination is made at step S40, the control flow goes to step S70 corresponding to control function of the intermittent-operation-inhibition determining portion 92d, which is implemented to set the intermittent-operation-inhibition threshold value α for the case in which the shift operation position Psh is the P position. When the shift operation position Psh is the P position, the above-described sum (=Wne+Wast) of the cranking electric power Wne (used for cranking the engine 12) and the auxiliary-devices electric power Wast (required by the auxiliary devices) is used as the intermittent-operation-inhibition threshold value α, for example.

When a negative determination is made at step S40, step S50 corresponding to control function of the intermittent-operation-inhibition determining portion 92d is implemented to determine whether the vehicle driver is without the intention to accelerate the vehicle 10. This determination regarding the vehicle driver's invention for the acceleration is made, for example, depending on whether the accelerator opening degree θacc is zero (or a value close to zero) or not. When a negative determination is made at step S50, the control flow goes to step S80 that is implemented to set the normal-case intermittent-operation-inhibition threshold value α.

When an affirmative determination is made at step S50, step S60 corresponding to control function of the intermittent-operation-inhibition determining portion 92d is implemented to determine whether the brake depressing force Fbrk is equal to or larger than the predetermined value K. When it is determined at step S60 that the brake depressing force Fbrk is smaller than the predetermined value K, the control flow goes to step S80 that is implemented to set the normal-case intermittent-operation-inhibition threshold value α. When it is determined at step S60 that the brake depressing force Fbrk is not smaller than the predetermined value K, step S70 is implemented to set the intermittent-operation-inhibition threshold value α that is dependent on the brake depressing force Fbrk.

As described above, in the present embodiment, the intermittent operation of the engine 12 is inhibited, when the maximum dischargeable amount Wout, which is the maximum amount of the electric power that can be discharged from the battery 54, is not larger than the intermittent-operation-inhibition threshold value α that is not smaller than the start-case-required electric power Wneed required upon start of the engine 12, so that it is possible to suppress the shock caused due to insufficiency of the electric power upon start of the engine 12. Further, since the difference value δ between the intermittent-operation-inhibition threshold value α and the start-case-required electric power Wneed is not larger than the predetermined value M, it is possible to minimize a length of time for which the engine 12 is driven, and accordingly to suppress reduction of the fuel economy.

In the present embodiment, when the vehicle running speed V is in the range not higher the predetermined speed value Vlow, the intermittent-operation-inhibition threshold value α includes the acceleration-case-required electric power Wacc required to accelerate the vehicle 10, so that it is possible to ensure the acceleration performance in the low range of the running speed V in which the acceleration performance is required. Further, the intermittent-operation-inhibition threshold value α is set to the value that is constant or increased as the running speed V is increased, so that it is possible to suppress frequent switch between start and stop of the engine 12, even in a case in which the start-case-required electric power Wneed is fluctuated due to the shift-down actions executed in the automatic transmission 24. Further, when the vehicle 10 is being stopped, the intermittent-operation-inhibition threshold value α is changed depending on the brake depressing force Fbrk, such that the intermittent-operation-inhibition threshold value α is reduced as the brake depressing force Fbrk is increased. Thus, the intermittent-operation-inhibition threshold value α is set to a value appropriately dependent on the brake depressing force Fbrk, the reduction of the fuel economy can be further suppressed. Further, when the shift operation position Psh is the P position, the intermittent-operation-inhibition threshold value α is set to the minimum value αmin which is determined for when the vehicle 10 is being stopped and which is irrespective of the brake depressing force Fbrk, so that the engine 12 in unlikely to be driven whereby the reduction of the fuel economy can be further suppressed.

While the preferred embodiment of this invention has been described in detail by reference to the drawings, it is to be understood that the invention may be otherwise embodied.

For example, in the above-described embodiment, the intermittent-operation-inhibition threshold value α, which is set during the coast running, is set to the same value as the start-case-required electric power Wneed or to a value close to the start-case-required electric power Wneed within a range in which the hunting is not caused, except for the low range of the vehicle running speed V. However, by taking account of a possible case that the vehicle 10 is re-accelerated from a state of the coast running, the electric power required for the re-acceleration in such a possible case may be added to the intermittent-operation-inhibition threshold value α. That is, the electric power required for the acceleration may be added to the intermittent-operation-inhibition threshold value α, not only when the running speed V is in the low range but also when the running speed V is in other range other than the low range.

In the above-described embodiment, in the low range of the vehicle running speed V in which the running speed V is not higher than the predetermined speed value Vlow, the intermittent-operation-inhibition threshold value α is set to the intermittent-operation-inhibition threshold value αvlow in which the acceleration-case-required electric power Wacc is added to the start-case-required electric power Wneed. However, the acceleration-case-required electric power Wacc does not necessarily added to the start-case-required electric power Wneed, so that the intermittent-operation-inhibition threshold value α may be reduced so as to be changed along with the start-case-required electric power Wneed, as represented by broken line in the low range of the vehicle running speed V in FIG. 3.

In the above-described embodiment, when the brake depressing force Fbrk is not smaller than the predetermined value K in a state in which the vehicle 10 is being stopped, the intermittent-operation-inhibition threshold value α is reduced as the brake depressing force Fbrk is increased. However, this arrangement is not essential. For example, in the state in which the vehicle 10 is being stopped, the intermittent-operation-inhibition threshold value α may be set to the predetermined minimum value αmin when the brake depressing force Fbrk is not smaller than a predetermined value, and may be set to the intermittent-operation-inhibition threshold value αvlow when the brake depressing force Fbrk is smaller than the predetermined value. Thus, the intermittent-operation-inhibition threshold value α may be changed in a step manner, depending on the brake depressing force Fbrk. In this case, too, the intermittent-operation-inhibition threshold value α is reduced as the brake depressing force Fbrk is increased.

In the above-described embodiment, when the shift operation position Psh is the P position, the sum of the cranking electric power Wne and the auxiliary-devices electric power Wast is used as the intermittent-operation-inhibition threshold value α. However, the intermittent-operation-inhibition threshold value α, when the shift operation position Psh is the P position, may be set to a value that is other than the sum of the cranking electric power Wne and the auxiliary-devices electric power Wast.

In the above-described embodiment, the automatic transmission 24 is the step-variable automatic transmission including the at least one planetary gear device and the plurality of engagement devices CB. However, this arrangement is not essential. For example, the automatic transmission 24 may be also a known belt-type continuously variable transmission or a synchronous mesh twin shaft parallel axis-type automatic transmission including a known DCT (Dual Clutch Transmission).

It is to be understood that the embodiment described above is given for illustrative purpose only, and that the present invention may be embodied with various modifications and improvements which may occur to those skilled in the art.

NOMENCLATURE OF ELEMENTS

10: vehicle (hybrid electric vehicle)
12: engine (internal combustion engine)
14: drive wheels
20: K0 clutch (frictional engagement device)
24: automatic transmission (transmission)
54: battery (electric storage device)
90: electronic control apparatus (control apparatus)
MG: electric motor
M: predetermined value
Vlow: predetermined speed value
Wout: maximum dischargeable amount (outputtable electric power outputtable from electric storage device)
Wneed: start-case-required electric power (required to start internal combustion engine)
Wacc: acceleration-case-required electric power (required to accelerate vehicle)
α: intermittent-operation-inhibition threshold value (threshold value)
δ: difference value

What is claimed is:
1. A hybrid electric vehicle comprising:
an internal combustion engine;
an electric motor;
drive wheels;
a frictional engagement device disposed between the internal combustion engine and the electric motor in a power transmission path through which a power is to be transmitted from the internal combustion engine to the drive wheels;
a transmission disposed between the electric motor and the drive wheels in the power transmission path;
a battery configured to supply an electric power to the electric motor, wherein when the internal combustion engine is to be started, the frictional engagement device is engaged to transmit a torque from the electric motor to the internal combustion engine, for thereby starting the internal combustion engine; and
a processor that is configured to inhibit stop of the internal combustion engine, when an outputtable electric power outputtable from the battery is not larger than a threshold value that is determined based on a start-case-required electric power that is required to start the internal combustion engine such that the threshold value is not smaller than the start-case-required electric power,
wherein, when the vehicle is being stopped, the threshold value is set to a value that is changed depending on a brake depressing force applied to a brake operating member of the vehicle, such that the threshold value is reduced substantially inversely proportional to increase of the brake depressing force.
2. The hybrid electric vehicle according to claim 1, wherein the threshold value includes an acceleration-case-required electric power required to accelerate the vehicle, when a running speed of the vehicle is in a range not higher than a predetermined speed value.
3. The hybrid electric vehicle according to claim 1, wherein the threshold value is set to a value that is constant or increased as a running speed of the vehicle is increased.
4. The hybrid electric vehicle according to claim 1, wherein, when a shift operation position, which is to be changed by a shift operation device of the vehicle, is a vehicle stop position, the threshold value is set to a minimum value that is irrespective of the brake depressing force.
5. The hybrid electric vehicle according to claim 1, wherein the start-case-required electric power, which is required to start the internal combustion engine, includes a first required electric power required to increase a rotational speed of the internal combustion engine by the electric motor, a second required electric power required to eliminate backlash present in the power transmission path, and a third required electric power that is to be consumed by auxiliary devices provided in the vehicle.

* * * * *